United States Patent
Tozawa et al.

(10) Patent No.: US 7,310,997 B2
(45) Date of Patent: Dec. 25, 2007

(54) TIRE WARNING DEVICE DETECTING TENSILE FORCES OF REINFORCING CORD AND PNEUMATIC TIRE HAVING THE SAME

(75) Inventors: Yukio Tozawa, Hiratsuka (JP); Akira Kuramori, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 316 days.

(21) Appl. No.: 10/982,898

(22) Filed: Nov. 8, 2004

(65) Prior Publication Data

US 2005/0103413 A1    May 19, 2005

(30) Foreign Application Priority Data

Nov. 13, 2003    (JP)    ............................. 2003-383302

(51) Int. Cl.
G01M 17/02    (2006.01)
B60C 23/02    (2006.01)

(52) U.S. Cl. ........................................ 73/146; 340/442
(58) Field of Classification Search ....... 73/146–146.8; 340/440–447
See application file for complete search history.

(56) References Cited

U.S. PATENT DOCUMENTS

| | | | | |
|---|---|---|---|---|
| 3,662,596 A | * | 5/1972 | Siefert | .................... 73/862.392 |
| 4,150,567 A | * | 4/1979 | Prevorsek et al. | ............. 73/146 |
| 5,573,610 A | * | 11/1996 | Koch et al. | ............... 152/152.1 |
| 6,591,668 B1 | * | 7/2003 | Becherer et al. | ............... 73/146 |
| 6,624,748 B1 | * | 9/2003 | Phelan et al. | ................ 340/442 |
| 7,000,462 B2 | * | 2/2006 | Hillenmayer et al. | ...... 73/146.5 |
| 7,158,018 B2 | * | 1/2007 | Schick | ........................ 340/442 |

FOREIGN PATENT DOCUMENTS

JP    63-189703 A1    8/1988
JP    03-262716 A1    11/1991

* cited by examiner

*Primary Examiner*—Andre J. Allen
*Assistant Examiner*—Jermaine Jenkins
(74) *Attorney, Agent, or Firm*—Rader, Fishman & Grauer PLLC

(57) ABSTRACT

This invention provides a tire warning device which detects tensile forces of at least one of reinforcing cords of a carcass ply or belt ply of a pneumatic tire and provides a warning on the basis of the tensile forces detected. The tire warning device includes a strain sensor to be attached to the at least one reinforcing cord for sensing a strain of the at least one reinforcing cord, transmitting means for transmitting a signal sensed by the strain sensor, receiving means for receiving a sensed signal from the transmitting means, processing means that calculates the tensile forces of the at least one reinforcing cord on the basis of the sensed signal input from the receiving means and determines whether the warning is provided or not on the basis of the calculated tensile forces, and warning means for providing the warning based on the determination of the processing means.

10 Claims, 2 Drawing Sheets

TIRE WARNING DEVICE DETECTING TENSILE FORCES OF REINFORCING CORD AND PNEUMATIC TIRE HAVING THE SAME

BACKGROUND OF THE INVENTION

The present invention relates to a warning device for tires and a pneumatic tire having a strain sensor thereof, and more particularly, to a tire warning device and a pneumatic tire which can make a contribution to safe traveling of a vehicle.

If traveling of a vehicle is kept without awareness of occurrence of tire breakdown during traveling, there is a risk that a serious traffic accident will be developed by burst of the tire. In particular, when traveling at high speed on an expressway or the like, a disastrous traffic accident will happen. Therefore, when tire breakdown occurs, it is very important to find it immediately for safe traveling.

Disclosed in Unexamined Japanese Patent Application Publication No. 3-262716 and Unexamined Japanese Utility Model Application Publication No. 63-189703 are conventional tire breakdown detection devices which use a temperature sensor, in which the temperature sensor senses the temperatures of the surface or cavity of a tire and tire breakdown is determined on the basis of the temperature changes. Occurrence of breakdown of a pneumatic tire significantly increases heat generated at a breakdown spot, and it is, therefore, very effective to find tire breakdown using the temperature sensor.

Such tire breakdown detection devices make a contribution to safe traveling of a vehicle. However, if it is possible to notify the driver of a state of the pneumatic tires of his vehicle before the pneumatic tire breaks down, a more contribution is made to his safe traveling.

SUMMARY OF THE INVENTION

An object of the present invention is to provide a tire warning device and a pneumatic tire which capable of greatly contributing to safe traveling of a vehicle. In order to achieve the above object, the present invention provides a tire warning device which detects tensile forces of at least one of reinforcing cords of a carcass ply or belt ply of a pneumatic tire and provides a warning on the basis of the tensile forces detected, the tire warning device comprising a strain sensor to be attached to the at least one reinforcing cord for sensing a strain of the at least one reinforcing cord, transmitting means for transmitting a signal sensed by the strain sensor, receiving means for receiving a sensed signal from the transmitting means, processing means that calculates the tensile forces of the at least one reinforcing cord on the basis of the sensed signal input from the receiving means and determines whether the warning is provided or not on the basis of the calculated tensile forces, and warning means for providing the warning based on the determination of the processing means.

A pneumatic tire according to the present invention includes a strain sensor of a tire warning device for sensing a strain of at least one of reinforcing cords of a carcass ply or belt ply of the tire, the tire warning device detecting tensile forces of the at least one reinforcing cord by use of the strain sensor and providing a warning on the basis of the tensile forces detected, the strain sensor being attached to the at least one of reinforcing cords of the carcass ply or belt ply.

Pneumatic tires may have breakdowns such as an edge separation of a belt ply or carcass ply when a high load is applied thereto during traveling of a vehicle. Pneumatic tires are more susceptible to breakdown as a load applied thereto is higher. The magnitude of a load applied to a pneumatic tire has a close relationship to tensile forces generated on the reinforcing cords of the carcass ply or belt ply which maintains the air pressure of the tire and supports the tire to which a load is applied, and if the tensile forces of the reinforcing cords can be detected, it can be learned whether there exists a risk of occurrence of tire breakdown or not.

According to the present invention described above, the warning means provides a warning on the basis of the tensile forces of the reinforcing cord of the carcass ply or belt ply of a pneumatic tire, and thus it is possible to notify the driver of the tire condition before breakdown of the pneumatic tire, thereby greatly contributing to safe traveling of a vehicle.

The magnitude of pressure of air with which a pneumatic tire is filled also has a close relationship to tensile forces generated on the reinforcing cords of the carcass ply or belt ply, and if the tensile forces of the reinforcing cord can be detected, it can be learned whether the air pressure of the tire is normal or not. Therefore, by providing a warning relating to tire air pressure by the warning means on the basis of the tensile forces of the reinforcing cord detected, an accident due to improper tire air pressure can also be prevented from occurring, thereby greatly contributing to safe traveling of a vehicle.

DETAILED DESCRIPTION OF THE PREFERRED EMBODIMENT

An embodiment of the present invention will be described in detail below with reference to the drawings.

Figure 1:
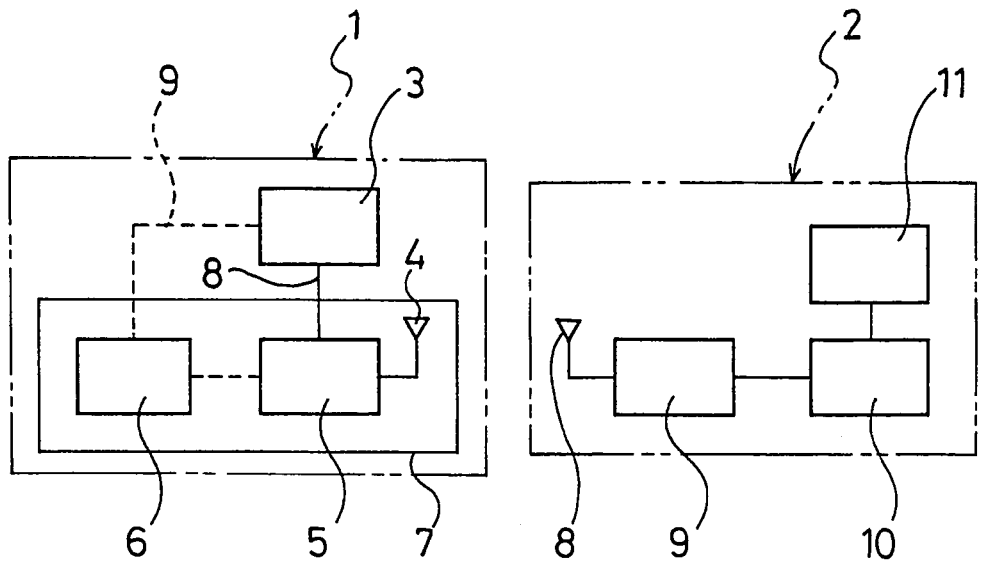
FIG. 1 is a view for illustrating a tire warning device according to the present invention.

Referring to FIG. 1, there is shown an embodiment of a tire warning device according to the present invention, and reference numeral 1 denotes a tire mount unit to be mounted on a pneumatic tire and reference numeral 2 denotes a vehicle mount unit to be mounted on a vehicle.

The tire mount unit 1 includes a strain sensor 3 for sensing a strain of a reinforcing cord of a tire, a transmitting means 5 for transmitting a sensed signal of the strain sensor 3 through an antenna 4 to the vehicle mount unit 2, and a battery 6 as a power source for operation of the strain sensor 3 and the transmitting means 5. The transmitting means 5 and battery 6 are contained in a casing 7 and the transmitting means 5 sends signals sensed by the strain sensor 5 sequentially. The strain sensor 3 is electrically connected to the transmitting means 5 and the battery 6 in the casing 7 through electrical wires 8 and 9. For the strain sensor 4, for example, a resistance strain gauge type sensor may preferably be employed, which has a foil that is made of a copper alloy such as nickel copper or the like as a sensing element and is to be bonded to the reinforcing cord. In particular, a strain gauge having a foil for low elasticity is desirably used.

Figure 2:
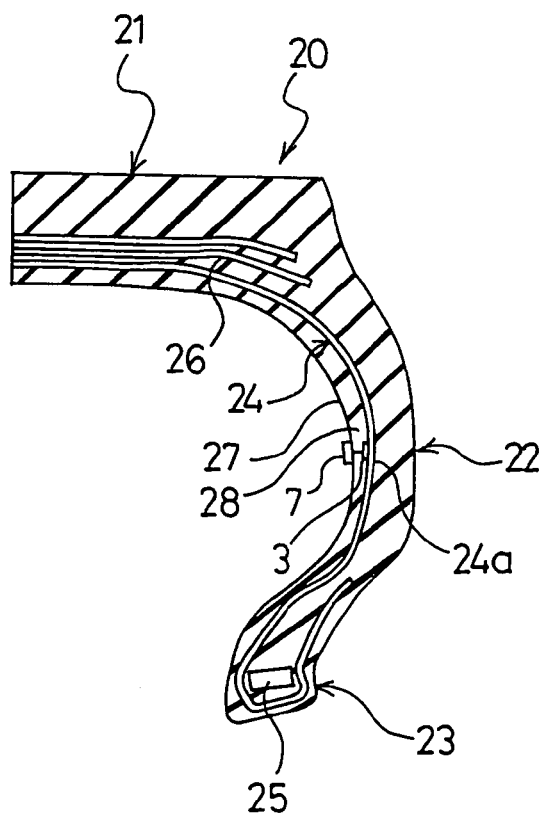
FIG. 2 is a partial cross-sectional view of a pneumatic tire having the tire mount unit shown in FIG. 1.

The tire mount unit 1 is to be attached to a pneumatic tire 20, as shown in FIG. 2, for example. In the drawing shown, reference numeral 21 denotes a tread portion, reference numeral 22 denotes a sidewall portion, and reference numeral 23 denotes a bead portion. A carcass ply 24 which has tire-radially extending reinforcing cords arranged at predetermined intervals along a circumferential direction of the tire, is disposed between the left and right bead portions 23 in the tire, and the opposing ends of the carcass ply 24 are turned up outwardly from the inner sides of the tire around bead cores 25 embedded in the bead portions 23. Provided outwardly of the carcass ply 24 in the tread portion 21 are belt plies 26 having reinforcing cords that are arranged so as to incline with respect to the tire circumferential direction.

The strain sensor 3 is attached to at least one of the reinforcing cords of the carcass ply 24 at a section 24a thereof that is located substantially in the tire maximum width position, and the casing 7 is bonded to an inner surface 27 of the tire near the attached strain sensor 3. The strain sensor 3 may be attached as follows, for example. A part of an innerliner 28 located inwardly of the carcass ply 24 of the cured tire 20 is removed to partially expose some reinforcing cords of the carcass ply 24, and the strain sensor 3 is bonded to the exposed part of at least one of the reinforcing cords exposed. After attachment of the strain sensor, the part of the innerliner 28 where the reinforcing cords are exposed is filled with uncured rubber, and the uncured rubber is cured to repair it. In the alternative, the strain sensor 3 may previously be bonded to at least one of the reinforcing cords of the carcass ply 24 before curing of the tire.

It is the most preferable from the point of view of measurement accuracy that the strain sensor 3 be attached to the reinforcing cord of the carcass ply 24 in the sidewall portion 22 where strain is maximal during traveling. However, it will be appreciated that the strain sensor 3 may be attached to the reinforcing cord of the carcass ply 24 in any other portion of the tire. The strain sensor 3 may also be attached to at least one of the reinforcing cords of the belt plies 26.

The vehicle mount unit 2 includes a receiving means 9 for receiving the sensed signals from the transmitting means 5 through an antenna 8, a processing means 10 for processing the sensed signals input from the receiving means 9, and a warning means 11 for providing a warning to the driver on the basis of the results in the processing means 10.

The processing means 10 calculates tensile forces of the reinforcing cord of the carcass ply 24 to which the strain sensor 3 is attached on the basis of the sensed signals input from the receiving means 9, and determines whether a warning is provided or not, based on the calculated tensile forces.

That is, The processing means 10 calculates the amounts a (mm) of strain of the reinforcing cord of the carcass ply 24 to which the strain sensor 3 is attached, using each of the sensed signals input sequentially from the receiving means 9, and then calculates the tensile forces M (N) of the reinforcing cord of one revolution of the tire by the following expression, using the calculated strain amounts a:

$$M = E \times S \times a / L$$

where E is the elastic modulus (GPa) of the reinforcing cord of the carcass ply 24, S is the cross-sectional area (mm$^2$) of the reinforcing cord of the carcass ply 24, and L is the strain measurement section length (mm) of the reinforcing cord of the carcass ply 24. These data are stored in the memory embedded in the processing means 10, and conveniently selected for a pneumatic tire used.

Figure 3:
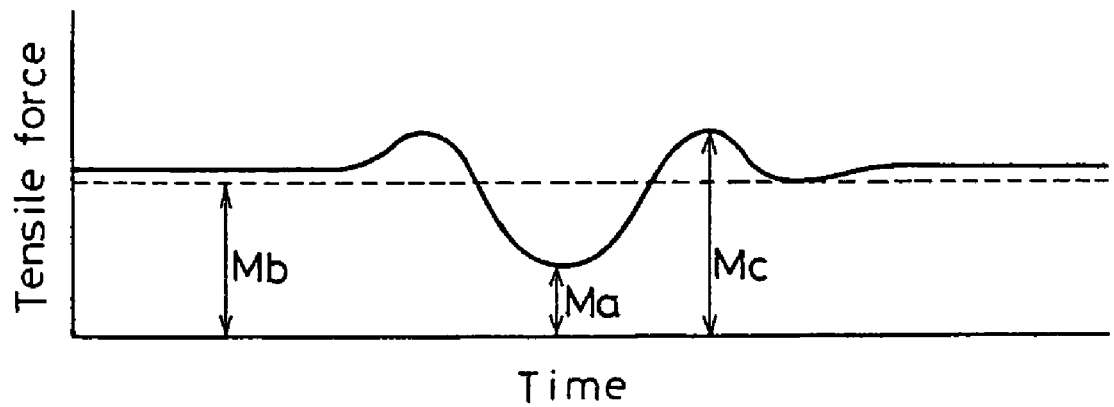
FIG. 3 is a graph showing an example of the tensile force changes of the reinforcing cord of the carcass ply of a tire over one revolution of the tire when the tire mount unit is mounted on a sidewall portion of the tire.
Figure 4:
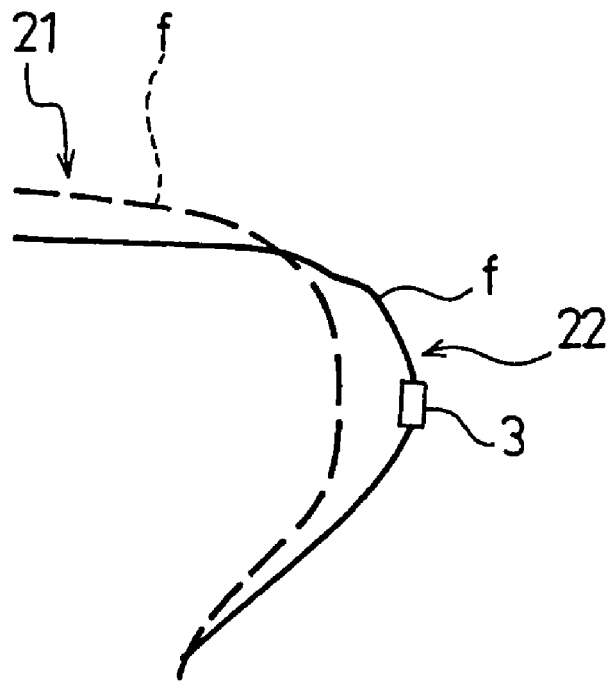
FIG. 4 is a view for illustrating changes of the reinforcing cord of the carcass ply of a tire during traveling of a vehicle.

In FIG. 3, there is shown a graph depicting a variation of the reinforcing cord tensile forces M to be obtained for one revolution of the tire when the strain sensor 3 is provided in the sidewall 22 as shown in FIG. 2. The time is plotted along the abscissa and the strain along the ordinate in the graph. In the case of FIG. 2 in which the strain sensor 3 is placed in the sidewall portion 22, the tensile force M of the reinforcing cords of the carcass ply 24 temporarily increases immediately before and after the portion of the tread surface corresponding to the attachment position of the strain sensor 3 engages a road surface. The parts of the sidewall portions 22 are deformed axially outwardly of the tire when a part of the tread surface corresponding to the parts of the sidewalls engages a road surface, and with it, as shown in FIG. 4, the reinforcing cords f of the carcass ply 24 are deformed axially outwardly of the tire in the sidewalls 22 from their disengaging state with a road surface shown in broken lines. The curvature radius of the deformed reinforcing cords f becomes smaller, and the tensile forces M of the deformed reinforcing cords are lowered.

In such a case where the tensile forces are lowered during engaging with a road surface, the processing means 10 further calculates a mean value Mb of the calculated tensile forces M of the reinforcing cord of one revolution of the tire, and then computes the ratio Ma/Mb of the minimum value Ma of the tensile forces M thereof to the mean value Mb.

The ratio Ma/Mb obtained is then compared with two preset threshold values including a first threshold value and a second threshold value. The first threshold value is a threshold value of a high risk that a tire breakdown (an edge separation of the carcass ply 24 or the belt plies 26 or the like) will occur if the driver keeps driving with the present state. The processing means 10 determines whether or not the ratio Ma/Mb is less than the first threshold value. If the processing means 10 determines that the ratio Ma/Mb is less than the first threshold value, the warning means 11 is activated and provides the driver a warning for notifying that the tire is in a high-loaded state having a high risk of occurrence of tire breakdown, for example, by turning on a red lamp or by giving a warning sound.

The second threshold value is a threshold value for notifying that the tire is in a state close to a high risk of occurrence of tire breakdown, and is greater than the first threshold value. The processing means 10 determines whether or not the ratio Ma/Mb is less than the second threshold value and is equal to or greater than the first threshold value. If the processing means 10 determines that the ratio Ma/Mb is less than the second threshold value, and is equal to or greater than the first threshold value, the warning means 11 is activated to provide the driver a precautionary warning for notifying that the tire is in a state close to a high risk of occurrence of tire breakdown, for example, by turning on a yellow lamp or by giving a warning sound other than the above warning sound.

The ratio Ma/Mb is used here, but in the alternative, the ratio Ma/Mc of the minimum value Ma and the maximum value Mc thereof may be employed.

The processing means 10 also compares the minimum value Ma with preset third and forth threshold values. The third threshold value is a threshold value for showing that the air pressure of the tire is insufficient. The processing means 10 determines whether or not the minimum value Ma is less than the third threshold value. If the processing means 10 determines that minimum value Ma is less than the third threshold value, the warning means 11 is activated, and provides the driver a warning for showing that the tire air pressure is insufficient.

The forth threshold value is a threshold value for showing that the tire air pressure is close to an insufficient air pressure, and is greater than the third threshold value. The processing means 10 determines whether or not the minimum value Ma is less than the fourth threshold value and is equal to or greater than the third threshold value. If the processing means 10 determines that the minimum value Ma is less than the fourth threshold value and is equal to or greater than the third threshold value, the warning means 11 is activated to provide the driver a precautionary warning for showing that the tire air pressure is close to an insufficient air pressure.

The determinations of the tire air pressure described above are based on the fact that the tensile forces M of the reinforcing cords f of the carcass ply 24 decrease in the sidewall portions 22 as the tire air pressure decreases, as in the above-mentioned case of the high load. The mean value Mb may be used in the alternative of the minimum value Ma.

The processing means 10 further compares the maximum value Mc of the tensile forces M of the reinforcing cord of the carcass ply 24 to which the strain sensor 3 is attached with preset fifth and sixth threshold values. The fifth threshold value is a threshold value for showing that the air pressure of the tire is excessive. The processing means 10 determines whether or not the maximum value Mc is greater than the fifth threshold value. If the processing means 10 determines that the maximum value Mc is greater than the fifth threshold value, the warning means 11 is activated, and provides the driver a warning for showing that the tire air pressure is excessive.

The sixth threshold value is a threshold value for showing that the tire air pressure is close to an excessive air pressure, and is less that the fifth threshold value. The processing means 10 determines whether or not the maximum value Mc is greater than the sixth threshold value and is equal to or less than the fifth threshold value. If the processing means 10 determines that the maximum value Mc is greater than the sixth threshold value and is equal to or less than the fifth threshold value, the warning means 11 is activated to provide the driver a precautionary warning for showing that the tire air pressure is close to an excessive air pressure.

The determinations of the tire air pressure described above are based on the fact that the tensile forces M of the reinforcing cords f of the carcass ply 24 increase in the sidewall portions 22 as the tire air pressure increases. The mean value Mb may also be used in the alternative of the maximum value Mc.

A specific example of a pneumatic tire having a tire size of 205/65R15 will be explained below. The reinforcing cords of the carcass ply of the pneumatic tire is formed from polyester fiber cords of 1670 dtex/2, and the breaking strength thereof is 190 N.

In this tire, the first threshold value is 0.4, second threshold value 0.5, third threshold value 3 N, forth threshold value 5 N, fifth threshold value 72 N and sixth threshold value 36 N. If the ratio Ma/Mb of the minimum value Ma to the mean value Mb of the tensile forces of the reinforcing cord of the carcass ply to which the strain sensor 3 is attached is less than 0.4, the warning means 11 provides the driver a warning for notifying that there is a high risk of occurrence of tire breakdown. If the ratio Ma/Mb is less than 0.5 and is equal to or greater than 0.4, the warning means 11 provides the driver a precautionary warning.

Also, if the minimum value Ma of the tensile forces of the reinforcing cord of the carcass ply to which the strain sensor 3 is attached is less than 5 N, the warning means 11 provides the driver a warning for showing that the tire air pressure is insufficient. If the minimum value Ma is less than 5 N and is equal to or greater than 3 N, the warning means 11 provides the driver a precautionary warning for showing that the tire air pressure is close to an insufficient air pressure.

Further, if the maximum value Mc of the tensile forces of the reinforcing cord of the carcass ply to which the strain sensor 3 is attached is greater than 72 N, the warning means 11 provides the driver a warning for showing that the tire air pressure is excessive, and if the maximum value Mc is greater than 36 N and is equal to or less than 72 N, the warning means 11 provides the driver a precautionary warning for showing that the tire air pressure is close to an excessive air pressure.

When the ratio Ma/Mc of the minimum value Ma to the maximum value Mc is used in the alternative of the above ratio Ma/Mb and the mean value Mb is employed instead of the minimum value Ma and the maximum value Mc, the first threshold value is 0.2, second threshold value 0.3, third threshold value 6 N, forth threshold value 10 N, fifth threshold value 48 N and sixth threshold value 24 N.

The fifth and sixth threshold values mentioned above are numeric values when the tire inner pressure safety factor is eight times greater than that of the cord tension of the carcass ply.

In the above embodiment, there is illustrated the operation of the processing means 10 when the strain sensor 3 is attached to the reinforcing cord of the carcass ply 24 in the sidewall portion 22, and the tensile forces of the reinforcing cords thereof decrease during engaging with a road surface. However, in the case where the strain sensor 3 is attached to at least one of the reinforcing cords of the carcass ply 24 or the belt ply in the tread portion 21, and the tensile forces of the reinforcing cords thereof increase during engaging with a road surface, the ratio Mc/Mb is used instead of the ratio Ma/Mb and the processing means 10 determines whether or not the ratio Mc/Mb is greater than the first threshold value. If the processing means 10 determines that the value of the ratio Mc/Mb is greater than the first threshold value, the warning means 11 is activated to provide the driver a warning. If the processing means 10 determines that the ratio Mc/Mb is less than the second threshold value and is equal to or greater than the first threshold value, the warning means 11 is activated to provide the driver a precautionary warning.

According to the present invention described above, since the warning means 11 provides a warning on the basis of the tensile forces of the reinforcing cord of the carcass ply 24 or the belt ply 26, the driver can be notified of the tire condition before breakdown of the pneumatic tire 20, thereby greatly contributing to safe traveling of a vehicle.

The warning means 11 notifies the driver that the tire is close to a state having a high risk of occurrence of tire breakdown, thereby calling attention of the driver to the traveling of his vehicle and allowing for enhancement of safety for traveling.

The condition of tire air pressure can be detected using the tensile forces of the reinforcing cord of the carcass ply 24 or the belt ply 26, and therefore, the tire warning device of the present invention can also be employed as a tire air pressure warning device. Thus, it is possible to prevent an accident due to improper tire air pressure from occurring, allowing for further improvement of safe traveling.

In the present invention, the foregoing minimum value Ma, maximum value Mc and mean value Mb are obtained, using the data of one revolution of the tire. However, the minimum value, maximum value and mean value may be obtained, using the data of a plurality of revolutions of the tire, thereby preventing erroneous determinations by the processing means 10 due to road surface changes, sensor error and the like, and allowing for enhancement of accuracy for warning.

The warning device of the present invention is preferably arranged such that a plurality of groups of threshold values conforming to tire types are stored in the memory embedded in the processing means 10, and one of the plurality of groups conforming to the pneumatic tires mounted on a vehicle can be selected through a control panel (not shown).

What is claimed is:

1. A tire warning device which detects tensile forces of at least one of reinforcing cords of a carcass ply or belt ply of a pneumatic tire and provides a warning on the basis of the tensile forces detected, comprising:
    a strain sensor adapted for attachment to the at least one reinforcing cord, the strain sensor sensing a strain of the at least one reinforcing cord;
    transmitting means adapted for transmitting a signal sensed by the strain sensor;
    receiving means adapted for receiving a sensed signal from the transmitting means;
    processing means adapted for calculating the tensile forces of the at least one reinforcing cord on the basis of the sensed signal input from the receiving means and for determining whether the warning is provided or not on the basis of the calculated tensile forces; and
    warning means adapted for providing the warning based on the determination of the processing means, wherein:
    the strain sensor is attached to at least one of reinforcing cords of the carcass ply in a sidewall portion of the tire,
    the processing means determines whether or not the ratio Ma/Mb of the minimum value Ma of the calculated tensile forces of the at least one reinforcing cord to a mean value Mb thereof or the ratio Ma/Mc of the minimum value Ma to the maximum value Mc thereof is less than a preset first threshold value, and
    the warning means provides the warning for notifying that the tire is in a state having a high risk of occurrence of tire breakdown if the processing means determines that the ratio Ma/Mb or the ratio Ma/Mc is less than the first threshold value.

2. A tire warning device according to claim 1, wherein the processing means determines whether or not the ratio Ma/Mb or the ratio Ma/Mc is less than a preset second threshold value greater than the first threshold value and is equal to or greater than the first threshold value, and
    the warning means provides a precautionary warning for notifying that the tire is close to a state having a high risk of occurrence of tire breakdown if the processing means determines that the ratio Ma/Mb or the ratio Ma/Mc is less than the second threshold value and is equal to or greater than the first threshold value.

3. A tire warning device according to claim 1, wherein the processing means determines whether or not the minimum value Ma or the mean value Mb is less than a preset third threshold value, and
    the warning means provides a warning for showing that the air pressure of the tire is insufficient if the processing means determines that the minimum value Ma or the mean value Mb is less than the third threshold value.

4. A tire warning device according to claim 3, wherein the processing means determines whether or not the minimum value Ma or the mean value Mb is less than a preset fourth threshold value greater than the third threshold value and is equal to or greater than the third threshold value, and
    the warning means provides a precautionary warning for showing that the air pressure of the tire is close to an insufficient air pressure if the processing means determines that the minimum value Ma or the mean value Mb is less than the fourth threshold value and is equal to or greater than the third threshold value.

5. A tire warning device according to claim 1, wherein the processing means determines whether or not the maximum value Mc or the mean value Mb is greater than a preset fifth threshold value, and
    the warning means provides a warning for showing that the air pressure of the tire is excessive if the processing means determines that the maximum value Mc or the mean value Mb is greater than the fifth threshold value.

6. A tire warning device according to claim 5, wherein the processing means determines whether or not the maximum value Mc or the mean value Mb is greater than a preset sixth threshold value less than the fifth threshold value and is equal to or less than the fifth threshold value, and
    the warning means provides a precautionary warning for showing that the air pressure of the tire is close to an excessive air pressure if the processing means determines that the maximum value Mc or the mean value Mb is greater than the sixth threshold value and is equal to or less than the fifth threshold value.

7. A tire warning device which detects tensile forces of at least one of reinforcing cords of a carcass ply or belt ply of a pneumatic tire and provides a warning on the basis of the tensile forces detected, comprising:
    a strain sensor adapted for attachment to the at least one reinforcing cord, the strain sensor sensing a strain of the at least one reinforcing cord;
    transmitting means adapted for transmitting a signal sensed by the strain sensor;
    receiving means adapted for receiving a sensed signal from the transmitting means;
    processing means adapted for calculating the tensile forces of the at least one reinforcing cord on the basis of the sensed signal input from the receiving means and for determining whether the warning is provided or not on the basis of the calculated tensile forces; and
    warning means adapted for providing the warning based on the determination of the processing means, wherein:
    the strain sensor is attached to at least one of reinforcing cords of the carcass ply in a sidewall portion of the tire,
    the processing means determines whether or not the minimum value Ma of the calculated tensile forces of the at least one reinforcing cord or a mean value Mb thereof is less than a preset third threshold value, and
    the warning means provides the warning for showing that the air pressure of the tire is insufficient if the processing means determines that the minimum value Ma or the mean value Mb is less than the third threshold value.

8. A tire warning device according to claim 7, wherein the processing means determines whether or not the minimum value Ma or the mean value Mb is less than a preset fourth threshold value greater than the third threshold value and is equal to or greater than the third threshold value, and
    the warning means provides a precautionary warning for showing that the air pressure of the tire is close to an insufficient air pressure if the processing means determines that the minimum value Ma or the mean value Mb is less than the fourth threshold value and is equal to or greater than the third threshold value.

9. A tire warning device which detects tensile forces of at least one of reinforcing cords of a carcass ply or belt ply of a pneumatic tire and provides a warning on the basis of the tensile forces detected, comprising:

a strain sensor adapted for attachment to the at least one reinforcing cord, the strain sensor sensing a strain of the at least one reinforcing cord;

transmitting means adapted for transmitting a signal sensed by the strain sensor;

receiving means adapted for receiving a sensed signal from the transmitting means;

processing means adapted for calculating the tensile forces of the at least one reinforcing cord on the basis of the sensed signal input from the receiving means and for determining whether the warning is provided or not on the basis of the calculated tensile forces; and warning means adapted for providing the warning based on the determination of the processing means, wherein:

the strain sensor is attached to at least one of reinforcement cords of the carcass ply in a side wall portion of the tire, the processing means determines whether or not the maximum value Mc of the calculated tensile forces of the at least one reinforcing cord or a mean value Mb thereof is greater than a preset fifth threshold value, and the warning means provides the warning for showing that the air pressure of the tire is excessive if the processing means determines that the maximum value Mc or the mean value Mb is greater than the fifth threshold value.

10. A tire warning device according to claim 9, wherein the processing means determines whether or not the maximum value Mc or the mean value Mb is greater than a preset sixth threshold value less than the fifth threshold value and is equal to or less than the fifth threshold value, and the warning means provides a precautionary warning for showing that the air pressure of the tire is close to an excessive air pressure if the processing means determines that the maximum value Mc or the mean value Mb is greater than the sixth threshold value and is equal to or less than the fifth threshold value.

* * * * *